(12) United States Patent
Assarpour et al.

(10) Patent No.: US 8,489,849 B2
(45) Date of Patent: Jul. 16, 2013

(54) METHOD FOR PARAMATERIZED APPLICATION SPECIFIC INTEGRATED CIRCUIT (ASIC)/FIELD PROGRAMMABLE GATE ARRAY (FPGA) MEMORY-BASED TERNARY CONTENT ADDRESSABLE MEMORY (TCAM)

(75) Inventors: Hamid Assarpour, Arlington, MA (US); Andrew Hull, Chelmsford, MA (US)

(73) Assignee: Avaya Inc., Basking Ridge, NJ (US)

( * ) Notice: Subject to any disclaimer, the term of this patent is extended or adjusted under 35 U.S.C. 154(b) by 243 days.

(21) Appl. No.: 12/953,952

(22) Filed: Nov. 24, 2010

(65) Prior Publication Data

US 2011/0320693 A1      Dec. 29, 2011

Related U.S. Application Data

(60) Provisional application No. 61/359,076, filed on Jun. 28, 2010.

(51) Int. Cl.
*G06F 12/00* (2006.01)

(52) U.S. Cl.
USPC ............................ 711/200; 711/108; 711/207

(58) Field of Classification Search
USPC .......................................... 711/108, 200, 207
See application file for complete search history.

(56) References Cited

U.S. PATENT DOCUMENTS

| | | | |
|---|---|---|---|
| 6,862,281 B1 * | 3/2005 | Chandrasekaran | 370/392 |
| 7,424,468 B2 * | 9/2008 | Park et al. | 1/1 |
| 2003/0108043 A1 * | 6/2003 | Liao | 370/392 |
| 2006/0294297 A1 * | 12/2006 | Gupta | 711/108 |
| 2009/0168999 A1 * | 7/2009 | Boswell et al. | 380/44 |
| 2011/0123020 A1 * | 5/2011 | Choi et al. | 380/28 |

* cited by examiner

*Primary Examiner* — Reba I Elmore
(74) *Attorney, Agent, or Firm* — Anderson Gorecki & Rouille LLP

(57) ABSTRACT

A method and apparatus for providing TCAM functionality in a custom integrated circuit (IC) is presented. An incoming key is broken into a predefined number of sub-keys. Each sub-key is sued to address a Random Access Memory (RAM), one RAM for each sub-key. An output of the RAM is collected for each sub-key, each output comprising a Partial Match Vector (PMV). The PMVs are bitwise ANDed to obtain a value which is provided to a priority encoder to obtain an index. The index is used to access a result RAM to return a result value for the key.

19 Claims, 4 Drawing Sheets

METHOD FOR PARAMATERIZED APPLICATION SPECIFIC INTEGRATED CIRCUIT (ASIC)/FIELD PROGRAMMABLE GATE ARRAY (FPGA) MEMORY-BASED TERNARY CONTENT ADDRESSABLE MEMORY (TCAM)

CROSS REFERENCE TO RELATED APPLICATIONS

The present application claims the benefit of U.S. Provisional Patent Application No. 61/359,076 filed on Jun. 28, 2010, which is incorporated herein by reference in its entirety.

BACKGROUND

Unlike standard computer memory (random access memory or RAM) in which the user supplies a memory address and the RAM returns the data word stored at that address, a Content Addressable Memory (CAM) is designed such that the user supplies a data word and the CAM searches its entire memory to see if that data word is stored anywhere in it. If the data word is found, the CAM returns a list of one or more storage addresses where the word was found (and in some architectures, it also returns the data word, or other associated pieces of data). Thus, a CAM is the hardware embodiment of what in software terms would be called an associative array.

Binary CAM is the simplest type of CAM which uses data search words comprised entirely of 1s and 0s. Ternary CAM (TCAM) allows a third matching state of "X" or "Don't Care" for one or more bits in the stored dataword, thus adding flexibility to the search. For example, a ternary CAM might have a stored word of "10XX0" which will match any of the four search words "10000", "10010", "10100", or "10110". The added search flexibility comes at an additional cost over binary CAM as the internal memory cell must now encode three possible states instead of the two of binary CAM. This additional state is typically implemented by adding a mask bit ("care" or "don't care" bit) to every memory cell.

Ternary CAMs are often used in network routers, where each address has two parts: the network address, which can vary in size depending on the subnet configuration, and the host address, which occupies the remaining bits. Each subnet has a network mask that specifies which bits of the address are the network address and which bits are the host address. Routing is done by consulting a routing table maintained by the router which contains each known destination network address, the associated network mask, and the information needed to route packets to that destination. Without CAM, the router compares the destination address of the packet to be routed with each entry in the routing table, performing a logical AND with the network mask and comparing it with the network address. If they are equal, the corresponding routing information is used to forward the packet. Using a ternary CAM for the routing table makes the lookup process very efficient. The addresses are stored using "don't care" for the host part of the address, so looking up the destination address in the CAM immediately retrieves the correct routing entry; both the masking and comparison are done by the CAM hardware. Ternary CAMs are a common element in networking equipment because of their efficient use of memory space and fast lookup times. For example, when a network switch receives a data frame from one of its ports, it updates an internal table with the frame's source MAC address and the port it was received on. It then looks up the destination MAC address in the table to determine what port the frame needs to be forwarded to, and sends it out on that port. The MAC address table is usually implemented with a binary CAM so the destination port can be found very quickly, reducing the switch's latency.

SUMMARY

Conventional mechanisms such as those explained above suffer from a variety of deficiencies. One such deficiency is that conventional Application Specific Integrated Circuits (ASICs) or Field Programmable Gate Arrays (FPGAs), collectively referred to herein as custom Integrated Circuits (ICs), do not include the functionality required for TCAM or a CAM natively. One way to provide CAM functionality, which is very expensive, is to use registers and comparators.

Embodiments of the invention significantly overcome such deficiencies and provide mechanisms and techniques that provide a memory-based TCAM within a custom IC. The present invention provides a way to provide a CAM or TCAM using the standard memories provided in FPGAs or ASICs. The standard memories found in custom ICs are usually shallow depth memories, for example a 32×20 bit memory.

In a particular embodiment of a method for providing memory-based TCAM within a custom IC, the method includes breaking an incoming key into a predefined number of sub-keys and utilizing each the sub-key to address a Random Access Memory (RAM), one RAM for each sub-key. The method further includes collecting an output of the RAM for each sub-key, each output comprising a Partial Match Vector (PMV) and bitwise ANDing the PMVs to obtain a value. The method also includes providing the value to a priority encoder to obtain an index and using the index to access a result RAM to return a result value for the key.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a memory-based TCAM within a custom IC as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method and apparatus for implementing parameterized TCAMs in ASIC/FPGA devices with an architecture that is optimized to make the best use of the memory structures and logic elements available is presented. ASIC/FPGA memories can be either LUT (Look Up Table) based or non-LUT. The TCAM is implemented using the following parameters: a number of keys, a key width, a sub-key width and a result width. The use of parameters allows different size TCAMs to be easily created and adapted to different RAM architectures.

Figure 1:
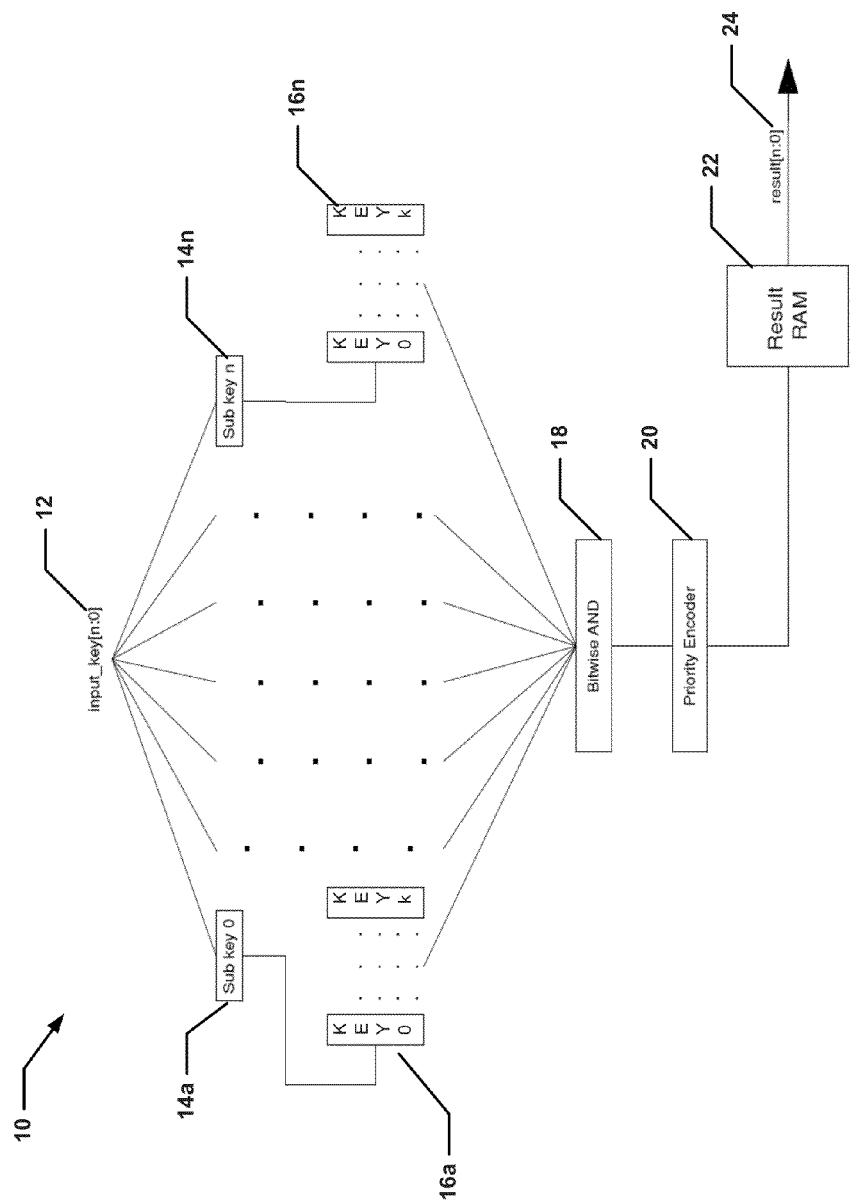
FIG. 1 depicts a high-level block diagram of a memory-based TCAM as part of a custom IC in accordance with embodiments of the invention.

Referring to FIG. 1, a high-level block diagram of a memory-based TCAM 10 as part of a custom IC in accordance with embodiments of the invention is shown. An incoming key 12 is broken into n-bit wide sub-keys 14a-14n based on the native memory size of the ASIC/FPGA. Each sub-key addresses a RAM 16a-16n that is 2" deep and k-bits wide, where n is the sub-key width and k is the number of keys. For example if there are 60 keys and the key width is 50, and assuming 5 bits per sub-key, then there would be 10 sub-keys and an array of 10 32×60 RAMs; one RAM for each sub-key.

The output of a sub-key RAM is referred to as Partial Match Vector (PMV) which consists of a k-bit vector (in this example 60-bit vector) where each bit position corresponds to a key number and the value of each bit indicates whether there exists a partial match. When multiple bits are set, it means that the sub-key partially matches multiple keys.

The outputs of the sub-key RAMs (PMVs) are bitwise ANDed together by logic device 18 so that all of the sub-keys have to have a hit for a given rule in order for that rule to be matched. The result of the bit wise AND logic device 18 is fed to a priority encoder 20 that returns an index of the lowest rule that matched the full key. The priority encoder 20 result is used as an index into a result ram 22 hat returns an n-bit result value. Note that multiple priority encoders may be used to return indices of multiple matches with the order of low to high index numbers.

A host interface (not shown) is used to program the keys and modify or delete keys while the TCAM 10 is performing search lookups. Host accesses are interleaved with lookup operations in a manner that does not affect the lookup bandwidth.

Figure 2:
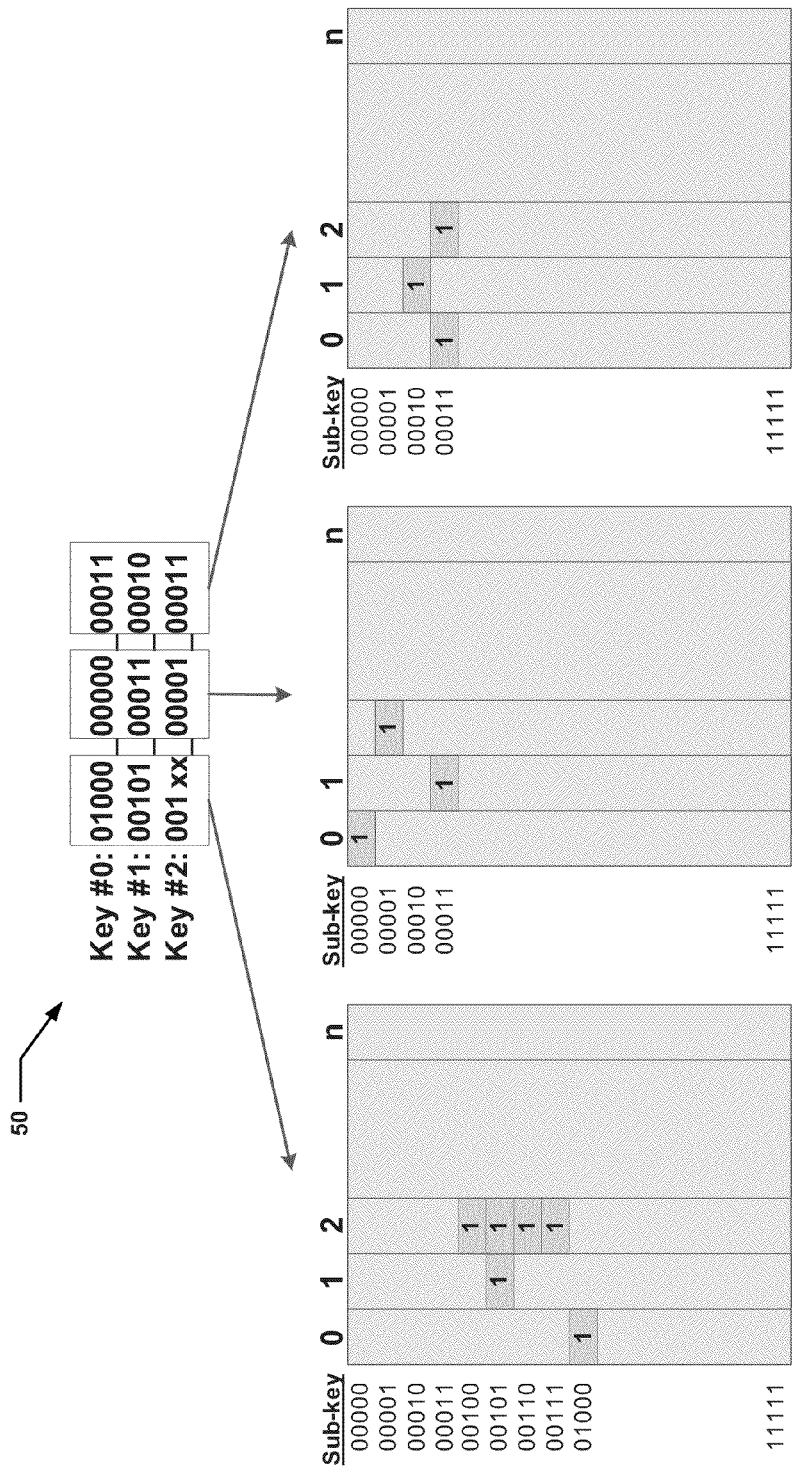
FIG. 2 depicts an example TCAM operation utilizing the memory based TCAM within a custom IC in accordance with embodiments of the invention.

Referring now to FIG. 2, an example is shown using three keys 12a, 12b and 12c. It is assumed that all sub-key memories 16a, 16b and 16c are cleared to zero during initialization. This Figure shows how Key #0, #1, and #2 are programmed into the appropriate sub-key memories. Any bit location set to one represents a partial match. Note that the first sub-key in Key #2 has x's. This sub-key is fully expanded and all corresponding bit locations for Key #2 in the Sub-key memory are set to 1.

During a search operation, a key value of "00101_00001_00011" will match Key #2 in all Sub-key memories, and priority encoder will return an index of 2. The first sub-key 00101 will result in the PMV of 0110, indicating that there was a partial match in two (locations one and two). The second sub-key 00001 will result in a PMV of 0010 indicating a partial match in location two only) and the third sub-key will result in a PMV of 1010 indicating a partial match in locations 0 and two. A bitwise logical AND of the PMVs will result in a value of 0010. The priority encoder receives the 0010 and outputs a value of 2, which is used as an index into a result ram and returns the n-bit result value.

To delete a key, all the corresponding bit locations in the Sub-key memories are cleared to zero. In the above example, to delete Key #0, software sets the bit location 0 at sub-key addresses "01000", "00000", and "00011" to zero in the corresponding sub-key memories.

Figure 3A:
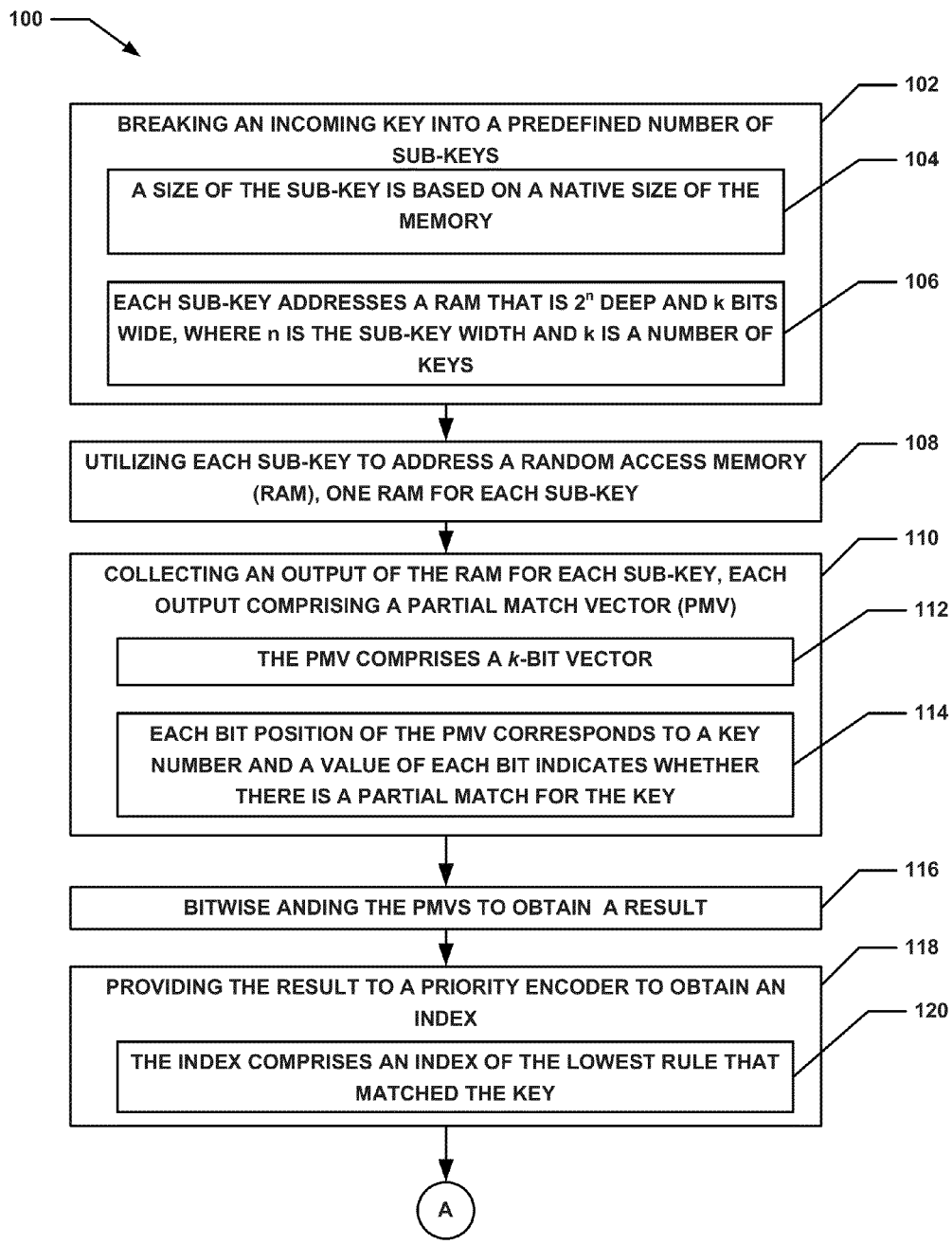
FIGS. 3A and 3B illustrates a flow diagram of a particular embodiment of a method of providing a memory based TCAM within a custom IC in accordance with embodiments of the invention.
Figure 3B:
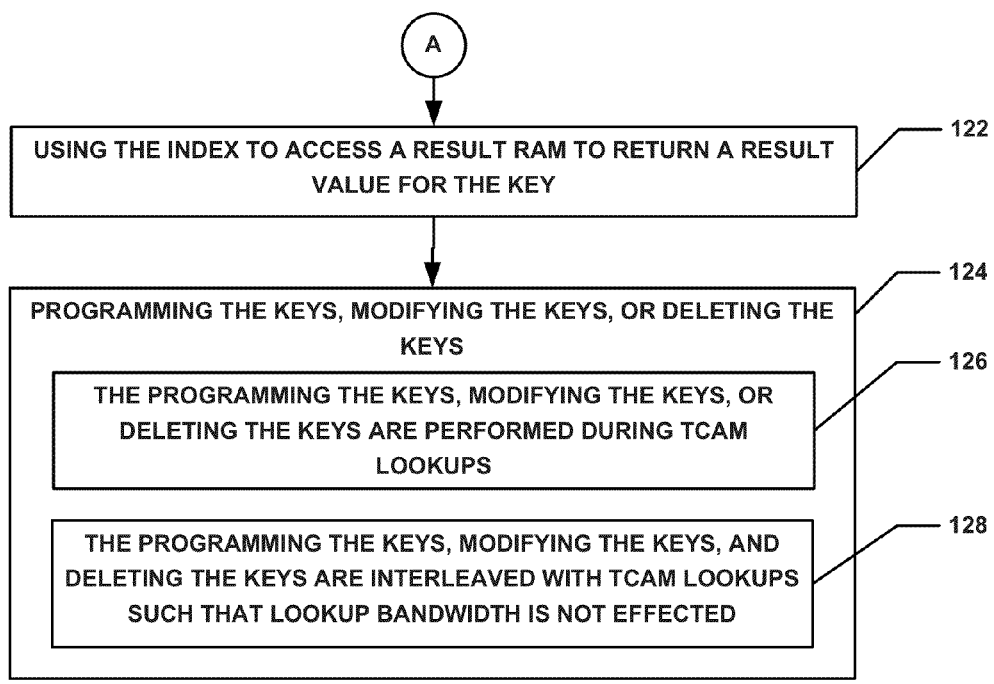

A flow chart of the presently disclosed method for parameterized ASIC/FPGA memory-based TCAMs is depicted in FIGS. 3A and 3B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A and 3B, a particular embodiment of a method 100 for implementing parameterized TCAMs in ASIC/FPGA devices with an architecture that is optimized to make the best use of the memory structures and logic elements available is shown. Method 100 begins with processing block 102 which discloses breaking an incoming key into a predefined number of sub-keys. As shown in processing block 104 a size of the sub-key is based on a native size of the memory. Processing block 106 states each sub-key addresses a RAM that is 2" deep and k bits wide, where n is the sub-key width and k is a number of keys. For example, when 32×20 RAM is used, 2" would be equal to 32, therefore n=5, so the key is broken into 5 bit wide sub-keys.

Processing block 108 recites utilizing each the sub-key to address a Random Access Memory (RAM), one RAM for each sub-key. Processing block 110 discloses collecting an output of the RAM for each sub-key, each output comprising a Partial Match Vector (PMV). As shown in processing block 112, the PMV comprises a k-bit vector. As further shown in processing block 114 each bit position of the PMV corresponds to a key number and a value of each bit indicates whether there is a partial match for the key. For example, as was discussed with respect to FIG. 2, the resulting PMVs were 0110, the second PMV 0010 and the third PMV was 1010.

Processing block 116 states bitwise ANDing the PMVs to obtain a value. In the example of FIG. 2, the bitwise ANDing of PMVs 0110, 0010 and 1010 results in a result of 0010. Processing block 118 recites providing the result to a priority encoder to obtain an index.

Processing block 120 discloses the index comprises an index of the lowest rule that matched the key. Processing continues with processing block 122 which states using the index to access a result RAM to return a result value for the key.

Processing block 124 recites programming the keys, modifying the keys, and deleting the keys. This is performed by a host interface. As shown in processing block 126, the programming the keys, modifying the keys, and deleting the keys are performed during TCAM lookups. As further shown in processing block 128 the programming the keys, modifying the keys, and deleting the keys are interleaved with TCAM lookups such that lookup bandwidth is not affected.

By way of the presently described method and apparatus, CAM and/or TCAM functionality is provided with in a custom IC using available memories within the custom IC. This solution is cost effective as compared to using registers and comparators for providing the same functionality.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A method comprising:
   breaking an incoming key into a predefined number of sub-keys;
   utilizing each said sub-key to address a Random Access Memory (RAM), one RAM for each sub-key;
   collecting an output of the RAM for each sub-key, each output comprising a Partial Match Vector (PMV);
   bitwise ANDing the PMVs to obtain a result;
   providing said result to a priority encoder to obtain an index, wherein said index comprises an index of the lowest rule that matched the key;
   using said index to access a result RAM to return a result value for said key.

2. The method of claim 1 wherein a size of said sub-key is based on a native size of the memory.

3. The method of claim 1 wherein each sub-key addresses a RAM that is $2^n$ deep and k bits wide, where n is the sub-key width and k is a number of keys.

4. The apparatus of claim 1 wherein said device comprises one of the group consisting of an Application Specific Integrated Circuit (ASIC) and a Field Programmable Gate Array (FPGA).

5. The method of claim 1 wherein said bitwise ANDing the PMVs to obtain a result indicates that all of said sub-keys have to have had a hit for a given rule in order for that rule to be matched.

6. The method of claim 1 wherein said PMV comprises a k-bit vector.

7. The method of claim 6 wherein each bit position of said PMV corresponds to a key number and a value of each bit indicates whether there is a partial match for said key.

8. The method of claim 1 further comprising at least one of the group consisting of programming said keys, modifying said keys, and deleting said keys.

9. The method of claim 8 wherein said programming said keys, modifying said keys, and deleting said keys are performed during TCAM lookups.

10. The method of claim 9 wherein said programming said keys, modifying said keys, and deleting said keys are interleaved with TCAM lookups such that lookup bandwidth is not effected.

11. An apparatus for providing Ternary content Addressable Memory (TCAM) functionality in a device comprising:
   providing a plurality of Random Access Memory (RAM) devices, each RAM device addressed by a sub-key of a key, said RAM device producing a Partial Match Vector (PMV) at an address referenced by said sub-key;

bitwise logic in communication with said plurality of RAM devices for performing an AND function on said PMVs to provide a result, wherein said index comprises an index of the lowest rule that matched the key;

a priority encoder receiving said result from said bitwise logic and providing an index, said priority encoder in communication with said bitwise logic; and a result RAM in communication with said priority encoder, said result RAM providing a result value for said key at said index address.

12. The apparatus of claim 11 wherein a size of said sub-key is based on a native size of the memory.

13. The apparatus of claim 11 wherein each sub-key addresses a RAM that is $2^n$ deep and k bits wide, where n is the sub-key width and k is a number of keys.

14. The apparatus of claim 11 wherein said bitwise AND-ing the PMVs to obtain a result indicates that all of said sub-keys have to have had a hit for a given rule in order for that rule to be matched.

15. The apparatus of claim 11 wherein said PMV comprises a k-bit vector.

16. The apparatus of claim 15 wherein each bit position of said PMV corresponds to a key number and a value of each bit indicates whether there is a partial match for said key.

17. The apparatus of claim 11 further comprising a host interface capable of at least one of the group consisting of programming said keys, modifying said keys, and deleting said keys.

18. The apparatus of claim 17 wherein said programming said keys, modifying said keys, and deleting said keys are performed during TCAM lookups.

19. The apparatus of claim 18 wherein said programming said keys, modifying said keys, and deleting said keys are interleaved with TCAM lookups such that lookup bandwidth is not effected.

* * * * *